(12) United States Patent
Liu et al.

(10) Patent No.: US 10,038,182 B2
(45) Date of Patent: Jul. 31, 2018

(54) GRAPHENE COATING MODIFIED ELECTRODE PLATE FOR LITHIUM SECONDARY BATTERY AND METHOD FOR PRODUCING THE SAME

(75) Inventors: Zhaoping Liu, Zhejiang (CN); Changlin Tang, Zhejiang (CN); Jiangang Zhang, Zhejiang (CN); Xufeng Zhou, Zhejiang (CN); Huasheng Hu, Zhejiang (CN)

(73) Assignee: NINGBO INSTITUTE OF MATERIAL TECHNOLOGY AND ENGINEERING, CHINESE ACADEMY OF SCIENCES, Zhejiang (CN)

( * ) Notice: Subject to any disclaimer, the term of this patent is extended or adjusted under 35 U.S.C. 154(b) by 925 days.

(21) Appl. No.: 13/577,471

(22) PCT Filed: Nov. 2, 2011

(86) PCT No.: PCT/CN2011/081697
§ 371 (c)(1),
(2), (4) Date: Mar. 16, 2014

(87) PCT Pub. No.: WO2012/151880
PCT Pub. Date: Nov. 15, 2012

(65) Prior Publication Data
US 2014/0315083 A1   Oct. 23, 2014

(30) Foreign Application Priority Data
May 12, 2011   (CN) .......................... 2011 1 0123113

(51) Int. Cl.
*H01M 4/66*   (2006.01)
*H01M 4/36*   (2006.01)
(Continued)

(52) U.S. Cl.
CPC ......... *H01M 4/136* (2013.01); *H01M 4/0404* (2013.01); *H01M 4/13* (2013.01);
(Continued)

(58) Field of Classification Search
CPC .............................. H01M 4/366; H01M 4/663
See application file for complete search history.

(56) References Cited

U.S. PATENT DOCUMENTS

2009/0246625 A1* 10/2009 Lu .................. H01M 4/133
429/207
2011/0033746 A1   2/2011 Liu et al.
(Continued)

FOREIGN PATENT DOCUMENTS

CN   1404170 A   3/2003
CN   1514501 A   7/2004
(Continued)

OTHER PUBLICATIONS

Seo-Yoon Bae et al., "Large-Area Graphene Films by Simple Solution Casting of Edge-Selectively Functionalized Graphite", American Chemical Society, vol. 5, No. 6, 4974-4980; Published Online: May 17, 2011; 7 pages.

*Primary Examiner* — Jonathan Crepeau
(74) *Attorney, Agent, or Firm* — Cantor Colburn LLP

(57) ABSTRACT

The present invention provides a graphene coating-modified electrode plate for lithium secondary battery, characterized in that, the electrode plate comprises a current collector foil, graphene layers coated on both surfaces of the current collector foil, and electrode active material layers coated on the graphene layers. A graphene coating-modified electrode plate for lithium secondary battery according to the present invention comprises a current collector foil, graphene layers coated on both surfaces of the current collector foil, and electrode active material layers coated on the graphene layers. The graphene-modified electrode plate for lithium secondary battery thus obtained increases the electrical conductivity and dissipation functions of the electrode plate due to the better electrical conductivity and thermal conductivity of graphene. The present invention further pro-
(Continued)

vides a method for producing a graphene coating-modified electrode plate for lithium secondary battery.

4 Claims, 1 Drawing Sheet

(51) Int. Cl.
| | |
|---|---|
| H01M 4/136 | (2010.01) |
| H01M 4/62 | (2006.01) |
| H01M 10/052 | (2010.01) |
| H01M 4/04 | (2006.01) |
| H01M 4/1397 | (2010.01) |
| H01M 4/13 | (2010.01) |
| H01M 4/139 | (2010.01) |
| H01M 4/02 | (2006.01) |

(52) U.S. Cl.
CPC ......... *H01M 4/139* (2013.01); *H01M 4/1397* (2013.01); *H01M 4/366* (2013.01); *H01M 4/622* (2013.01); *H01M 4/625* (2013.01); *H01M 4/663* (2013.01); *H01M 4/667* (2013.01); *H01M 10/052* (2013.01); *H01M 2004/021* (2013.01)

(56) References Cited

U.S. PATENT DOCUMENTS

2011/0256451 A1* 10/2011 Cui .......................... B32B 5/26
429/218.1

2011/0292570 A1* 12/2011 Ivanovici ............... B82Y 30/00
361/502
2012/0308861 A1* 12/2012 Xing ..................... H01M 4/131
429/94
2014/0335418 A1* 11/2014 Tamaki ................... H01M 4/13
429/231.8

FOREIGN PATENT DOCUMENTS

| | | |
|---|---|---|
| CN | 1540792 A | 10/2004 |
| CN | 1554695 A | 12/2004 |
| CN | 1588687 A | 3/2005 |
| CN | 1613907 A | 5/2005 |
| CN | 1744348 A | 3/2006 |
| CN | 1758463 A | 4/2006 |
| CN | 1797823 A | 7/2006 |
| CN | 101034741 A | 9/2007 |
| CN | 101037195 A | 9/2007 |
| CN | 101071860 A | 11/2007 |
| CN | 101369657 A | 2/2009 |
| CN | 101479043 A | 7/2009 |
| CN | 101710619 A | 5/2010 |
| CN | 201450056 U | 5/2010 |
| CN | 101752561 A | 6/2010 |
| CN | 101794874 A | 8/2010 |
| CN | 101849302 A | 9/2010 |
| CN | 101997120 A | 3/2011 |
| CN | 102208598 A | 10/2011 |
| CN | 102306800 A | 1/2012 |
| CN | 102315423 A | 1/2012 |

\* cited by examiner

GRAPHENE COATING MODIFIED ELECTRODE PLATE FOR LITHIUM SECONDARY BATTERY AND METHOD FOR PRODUCING THE SAME

CROSS REFERENCE TO RELATED APPLICATIONS

This is a U.S. national stage of application No. PCT/CN2011/081697, filed on 2 Nov. 2011. Priority under 35 U.S.C. § 119(a) and 35 U.S.C. § 365(b) is claimed from Chinese Application No. 201110123113.7, filed 12 May 2011, the disclosure of which are also incorporated herein by reference.

FIELD OF THE INVENTION

The present invention relates to a field of energy storage material technology, and more specifically relates to a graphene coating-modified electrode plate for lithium secondary battery.

BACKGROUND ART

With the depleting of traditional fossil fuels and increasing concern on environmental protection, demands for new green efficient energy becomes more and more urgent. The lithium-ion batteries, as a new energy source with a strong competitive advantage, draw extra attention. In addition to the widely application in the prior small and portable batteries, the development of lithium-ion batteries in high power and high energy power batteries is even more desirable.

Power lithium-ion battery requires high current and high-power charge and discharge during use; therefore, new requirements are raised on the electrochemical performance, security and thermal performance of the battery. According to the positive materials, mature power lithium batteries on the market include lithium iron phosphate battery, lithium manganate battery, etc. Conventional methods for improving the performance of lithium power batteries include, such as, the use of new electrode active material, electrolyte, diaphragm, and the use of a wound battery core design or a laminated battery core design, which however provide very limited improvement on the performance of the batteries. The electrode active material is the carrier of the electrochemical reaction in a battery charge and discharge process, and electrode active materials such as lithium iron phosphate, lithium manganate, and lithium titanate are poor in electrical conductivity; therefore, the ideal way to fundamentally improve the performance of lithium power batteries is by use of appropriate methods to improve the electrical conductivity and thermal conductivity of the electrode plate.

In order to improve the performance of lithium power batteries, researchers have considered the following aspects. The first aspect is to improve the conductive property of the electrode active material, such as to improve the conductive property of lithium iron phosphate (e.g., Chinese Patent Publication Nos. CN200710008713.2, CN200410101618.3 and CN200710075736.5), lithium manganate (e.g., Chinese Patent Application Nos. 200410062610.0 and 200710039149.0), lithium titanate, etc. by ion doping, or conductive material coating. However, such a method by improving the conductive property of the electrode active material has become a mature approach which is widely used in production. Accordingly, there is great difficulty in achieving a further breakthrough. The second aspect is to improve the battery production technology by appropriate methods, such as the development of laminated packaging technology (Chinese Patent Publication No. CN1540792A), the use of high conductive electrolyte, high-performance diaphragm (Chinese Patent Application Nos. CN 01130754.4, CN 03126299.6, CN200310117507.7, CN200410078320.5, CN200410057393.6, and CN200410081128.1), and strengthened control over the battery production process. Such a method has achieved some success. The third aspect is to improve the production and processing of the electrode plate, such as to produce an electrode plate with a multi-layer structure, such as lithium manganate layer/lithium iron phosphate layer, and make full use of the safety of the lithium iron phosphate material and high electrical conductivity of lithium cobaltate material, but no significant effect is achieved.

Modification of the electrode plate with high conductivity material may remarkably improve the conductivity of an electrode plate. The graphene material is a lonsdaleite material having a single or a few layers of $sp^2$ hybridized structure, wherein in the multilayer structure, the layers are bound in the form of a π bond therebetween. Since such electrons in the vicinity of Fermi energy are the Dirac electrons having an effective mass of 0, the graphene material has a conductivity of up to $10^6$ S/cm, which is the material with highest conductivity ever discovered. In the Chinese Patent Application Nos. 200910155316.7 and 201010226062.6, LIU Zhao-ping, et al, of Ningbo Institute of Materials Technology & Engineering, Chinese Academy of Science propose a method of improving conductivity of graphene by forming a composite comprising graphene and a polyanion material.

SUMMARY OF THE INVENTION

To overcome the disadvantages of the above technical solutions, the present invention provides a graphene coating-modified electrode plate for lithium secondary battery having excellent conductive property. Based on this, the present invention also provides a method for producing a graphene coating-modified electrode plate for lithium secondary battery.

To solve the above technical problem, the present invention provides the following technical solutions:

A graphene coating-modified electrode plate for lithium secondary battery, comprising a current collector foil, graphene layers coated on both surfaces of the current collector foil, and electrode active material layers coated on the graphene layers.

Preferably, the electrode active material layer is further coated with a graphene layer.

Preferably, the graphene layer has a thickness of 0.1 micron to 20 microns, the electrode active material layer has a thickness of 10 microns to 300 microns, and the current collector foil is copper foil or aluminum foil.

Preferably the electrode active material layer comprises 80 to 98 parts by mass of an electrode active material, 1 to 10 parts of a conductive additive, and 1 to 10 parts of a binder.

Preferably, the electrode active material includes a positive material or a negative material, the positive material comprises a polyanionic material and/or a lithium-containing metal oxide positive material, and the negative material is a negative material in which the potential difference between the medium value of the charge and discharge potential and of metal lithium is less than 2 V.

Preferably, the conductive additive includes one or more selected from the group consisting of graphite, expandable graphite, carbon nanotubes, carbon fibers, activated carbon, amorphous carbon, conductive carbon black, acetylene black, Super-Li, and KS-6; the binder includes one or more selected from the group consisting of polyvinylidene fluoride (PVDF), CMC, SBR, and LA series binders.

Preferably, the positive material includes one or more selected from the group consisting of lithium iron phosphate, lithium manganese phosphate, lithium vanadium phosphate, lithium iron silicate, lithium cobaltate, a nickel-cobalt-manganese ternary material, nickel-manganese/cobalt-manganese/nickel-cobalt binary materials, lithium manganate, spinel lithium nickel manganese oxide, and lithium-rich layered lithium nickel manganese oxide. The negative material includes one or more selected from the group consisting of natural graphite, artificial graphite, mesophase carbon microspheres, lithium titanate, silicon based alloys, silicon based oxides, tin based alloys, tin based oxides, and metal lithium.

Preferably, the graphene material and the binder are contained in the graphene layer at a mass ratio of from 4:1 to 99:1, wherein the graphene layer is a laminar carbon material comprising a single layer or 1 to 20 sublayers, the structure inside the sublayers being hexagonal honeycomb lattices formed by $sp^2$ hybrid orbitals of carbon atoms, and the structure between the sublayers being formed of carbon atoms bound by $\pi$ bond; or the graphene layer is a graphene material containing one or more of fluorine, nitrogen, oxygen, carbonyl, carboxyl, and hydroxyl and/or intercalated graphene; and the binder includes one or more selected from the group consisting of polyvinylidene fluoride, CMC, SBR, and LA series binders.

A method for producing a graphene coating-modified electrode plate for lithium secondary battery according to the present invention includes the following steps:

1) preparing a current collector foil;

2) coating both surfaces of the current collector foil with a graphene layer, the coating process comprising sufficiently mixing and dissolving 70 to 99 parts by weight of graphene and 1 to 30 parts by weight of a binder in 100 parts to 5,000 parts by weight of a solvent to obtain a slurry, applying the slurry to both surfaces of the foil, and drying the coated foil in an oven at 50° C. to 200° C.; and 3) coating the graphene layer with an electrode active material layer prepared by sufficiently mixing and dissolving 80 to 98 parts by weight of an electrode active material, 1 to 10 parts by weight of a conductive additive and 1 to 10 parts by weight of a binder in 50 to 500 parts by weight of a solvent to obtain a slurry, applying the slurry to the graphene layer, and drying the coated product in an oven at 50° C. to 200° C.

Preferably, the method further includes a step of further coating the electrode active material layer with a graphene layer.

A graphene coating-modified electrode plate for lithium secondary battery, comprising a current collector foil, a graphene layer coated on the surface of the current collector foil, and an electrode active material layer coated on the graphene layer.

Preferably, the graphene layer is coated on one or both surfaces of the current collector foil.

Preferably, the graphene layer and the electrode active material layer are alternately coated on the current collector foil, and the alternating layers include a total number of 1-20 layers.

Preferably, the outermost layer of the electrode plate is coated with a graphene layer.

Preferably, the graphene layer each has a thickness of 10 nanometers to 100 microns, the electrode active material layer each has a thickness of 10 microns to 300 microns, and the current collector foil is copper foil or aluminum foil.

Preferably, the graphene layer includes a regular and continuous coating, a mesh coating, an irregular non-continuous coating, or an irregular continuous coating.

Preferably, the graphene layer can be applied by spraying, printing, spin coating or smearing.

Preferably the electrode active material layer contains 80 to 98 parts by mass of an electrode active material, 1 to 10 parts of a conductive additive, and 1 to 10 parts of a binder.

Preferably, the electrode active material includes a positive material or a negative material, the positive material includes a polyanionic material and/or a lithium-containing metal oxide positive material, and the difference between the medium value of the charge and discharge potential of the negative material and the potential of metal lithium is less than 2 V.

Preferably, the conductive additive includes one or more selected from the group consisting of graphite, expandable graphite, grapheme, carbon nanotubes, carbon fibers, activated carbon, amorphous carbon, conductive carbon black, acetylene black, Super-Li, KS-6; the binder includes one or more selected from the group consisting of polyvinylidene fluoride, CMC, SBR, and LA series binders.

Preferably, the positive material includes one or more selected from the group consisting of lithium iron phosphate, lithium manganese phosphate, lithium vanadium phosphate, lithium iron silicate, lithium cobaltate, a nickel-cobalt-manganese ternary material, nickel-manganese/cobalt-manganese/nickel-cobalt binary materials, lithium manganate, spinel lithium nickel manganese oxide, and lithium-rich layered lithium nickel manganese oxide. The negative material includes one or more selected from the group consisting of natural graphite, artificial graphite, mesophase carbon microspheres, lithium titanate, silicon based alloys, silicon based oxides, tin based alloys, tin based oxides, and metal lithium.

Preferably, the graphene layer contains a graphene-containing conductive material and a binder at a mass ratio of from 4:1 to 99:1, wherein the graphene-containing conductive material includes graphene;

the graphene-containing conductive material further includes the combination of at least more than 5% by mass of graphene and one or more selected from the group consisting of graphite, expandable graphite, carbon nanotubes, carbon fibers, activated carbon, amorphous carbon, conductive carbon black, acetylene black, Super-Li, and KS-6;

the graphene layer is a laminar carbon material comprising a single layer or 1 to 20 sublayers, the structure inside the sublayers being hexagonal honeycomb lattices formed by $sp^2$ hybrid orbitals of carbon atoms, and the structure between the sublayers being formed of carbon atoms bound by $\pi$ bond; or the graphene layer is a graphene material containing one or more of fluorine, nitrogen, oxygen, carbonyl, carboxyl, and hydroxyl and/or intercalated graphene; and the binder includes one or more selected from the group consisting of polyvinylidene fluoride, CMC, SBR, and LA series binders.

A method for producing a graphene coating-modified electrode plate for lithium secondary battery according to the present invention includes the following steps:

1) preparing a current collector foil;

2) coating surfaces of the current collector foil with a graphene layer, the coating process comprising sufficiently mixing and dissolving 70 to 99 parts by weight of graphene and 1 to 30 parts by weight of a binder in 100 parts to 5,000 parts by weight of a solvent to obtain a slurry, applying the slurry to both surfaces of the foil, and drying the coated foil in an oven at 50° C. to 200° C.; and 3) coating the graphene layer with an electrode active material layer prepared by sufficiently mixing and dissolving 80 to 98 parts by weight of an electrode active material, 1 to 10 parts by weight of a conductive additive and 1 to 10 parts by weight of a binder in 50 to 500 parts by weight of a solvent to obtain a slurry, applying the slurry to the graphene layer, and drying the coated product in an oven at 50° C. to 200° C.

Preferably, the method further includes a step of further coating the electrode active material layer with a graphene layer and an electrode active material layer.

Compared with the prior art, a graphene coating-modified electrode plate for lithium secondary battery according to the present invention comprises a current collector foil, graphene layers coated on both surfaces of the current collector foil, and electrode active material layers coated on the graphene layers. The graphene-modified electrode plate for lithium secondary battery thus obtained increases the electrical conductivity and dissipation functions of the electrode plate due to the better electrical conductivity and thermal conductivity of graphene.

Further, by providing another graphene layer on the electrode active material layer such that the electrode active material layer is sandwiched between two graphene layers, the electrical conductivity is further improved. Power lithium-ion batteries produced using the electrode plate of are superior to the conventional power lithium-ion batteries in their high-power charge and discharge capacity.

DESCRIPTION OF THE DRAWINGS

In order to illustrate the technical solutions of examples of the present invention as well as those in the prior art more clearly, the drawings necessary for describing examples of the present invention and the prior art will be briefly described. Apparently, the drawings merely show a few of examples of the present invention, and those of ordinary skill in the art can achieve other drawings based on these drawings without creative labor.

MODES FOR CARRYING OUT THE PRESENT INVENTION

The present invention is basically conceived as modifying the electrode plate with graphene coating having high conductivity and high processability so as to improve the electrical conductivity and electrochemical performance of the electrode plate to meet the requirements of high power and high current charge and discharge use for lithium power batteries.

Next, a clear and complete description of the technical solutions in the embodiments of the present invention will be provided. Apparently, the embodiments described are merely some of, but not all of, the embodiments of the present invention. Based on the embodiments described, a person skilled in the art can carry out other embodiments without creative work, and all these embodiments should be constructed as within the scope of the present invention.

Figure 1:
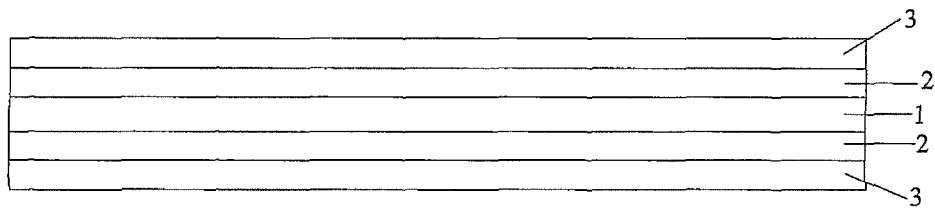
FIG. 1 is a structural schematic drawing showing an example of the graphene coating-modified electrode plate for lithium secondary battery of the present invention.

As shown in FIG. 1, in one embodiment, the graphene coating-modified electrode plate for lithium secondary battery of the present invention has a structure comprising a current collector foil 1, graphene layers 2 coated on both surfaces of the current collector foil 1, and electrode active material layers 3 coated on the graphene layers 2.

Figure 2:
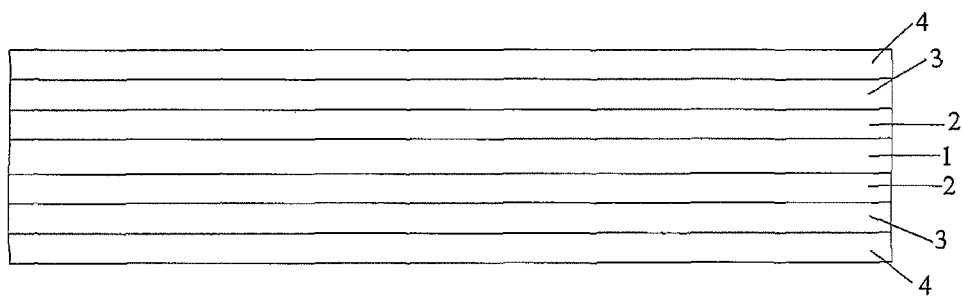
FIG. 2 is a structural schematic drawing showing another example of the graphene coating-modified electrode plate for lithium secondary battery of the present invention.

As shown in FIG. 2, in another embodiment, the graphene coating-modified electrode plate for lithium secondary battery of the present invention has a structure comprising a current collector foil 1, graphene layers 2 coated on both surfaces of the current collector foil 1, electrode active material layers 3 coated on the graphene layers 2, and additional graphene layers 4 coated on the electrode active material layers 3. Compared to the previous embodiment, the present embodiment encompasses an electrode plate wherein an inner and an outer graphene layer are provided on each side of the current collector foil 1.

The production of a electrode plate can be divided into the production of a positive electrode plate, and the production of a negative electrode plate wherein the positive electrode plate comprises an aluminum foil, graphene layers coated on both sides of the aluminum foil, positive material layers coated on the graphene layers, and optionally additional graphene layers coated on the positive material layers; and the negative electrode plate comprises a copper foil, graphene thin layers coated on both sides of the copper foil, negative material layers coated on the graphene layers, and optionally additional graphene layers coated on the negative material layers. Both the positive electrode plate and the negative electrode plate, viewing from the cross-section, include a foil at the center, graphene layers and electrode active material layers coated on both sides of the foil, as shown in FIG. 1 or FIG. 2, and additional graphene layers coated on the electrode active material layers.

The coating process for the graphene layer is as follows: sufficiently mixing and dissolving 70 to 99 parts by weight of graphene and 1 to 30 parts by weight of a binder in 100 parts to 5,000 parts by weight of a solvent to obtain a slurry, applying the slurry to both surfaces of the foil, and drying the coated foil in an oven at 50° C. to 200° C. to obtain a graphene layer modified foil, the thickness of the graphene layer being 0.1 microns to 20 microns. The binder includes one or more selected from the group consisting of polyvinylidene fluoride, CMC, SBR, and LA series binders, and the solvent includes NMP and water.

The process for producing the positive material layer is as follows: sufficiently mixing and dissolving 80 to 98 parts by weight of a positive material, 1 to 10 parts by weight of a conductive additive and 1 to 10 parts by weight of a binder in 50 to 500 parts by weight of a solvent to obtain a slurry, applying the slurry to both surfaces of the foil modified with the graphene layers, and drying the coated product in an oven at 50° C. to 200° C., to obtain a graphene layer modified positive electrode plate, the thickness of the positive electrode plate on a single side is 10 microns to 600 microns. The binder includes one or more selected from the group consisting of polyvinylidene fluoride, CMC, SBR, and LA series binders; the conductive additive includes one or more selected from the group consisting of graphite, expandable graphite, carbon nanotubes, carbon fibers, activated carbon, amorphous carbon, conductive carbon black, acetylene black, Super-Li, KS-6; the solvent includes NMP and water; and the positive material includes one or more selected from the group consisting of lithium iron phosphate, lithium manganese phosphate, lithium vanadium phosphate, lithium iron silicate, lithium cobaltate, a nickel-cobalt-manganese ternary material, nickel manganese/cobalt-manganese/nickel-cobalt binary materials, lithium manganate, spinel lithium nickel manganese oxide, and lithium-rich layered lithium nickel manganese oxide.

The process for producing the negative material layer is as follows: sufficiently mixing and dissolving 80 to 98 parts by weight of a negative material, 1 to 10 parts by weight of a conductive additive and 1 to 10 parts by weight of a binder in 50 to 500 parts by weight of a solvent to obtain a slurry, applying the slurry to both surfaces of the foil modified with the graphene layers, and drying the coated product in an oven at 50° C. to 200° C., to obtain a graphene layer modified negative electrode plate, the thickness of the negative electrode plate on a single side is 10 microns to 300 microns. The binder includes one or more selected from the group consisting of polyvinylidene fluoride, CMC, SBR, and LA series binders; the conductive additive includes one or more selected from the group consisting of graphite, expandable graphite, carbon nanotubes, carbon fibers, activated carbon, amorphous carbon, conductive carbon black, acetylene black, Super-Li, KS-6; the solvent includes NMP and water; and the negative material includes one or more selected from the group consisting of natural graphite, artificial graphite, mesophase carbon microspheres, lithium titanate, silicon based alloys, silicon based oxides, tin based alloys, tin based oxides, and metal lithium.

Production of Lithium Power Battery

The structure and production process of the lithium power battery of the present invention are the same as those of a conventional commercial lithium iron phosphate power battery and lithium manganate power battery, except that in the lithium power battery of the present invention, at least one of the negative and the positive electrode plates is the graphene-modified electrode plate of the present invention. An 18650 type power battery is used as a test battery in examples of the present application; however, the present invention is not limited such a power battery.

Conductivity Test

The conductivity of the electrode plate is tested by four-probe method, and the internal resistance of the battery is tested using a battery test system.

In order to further explain the technical solution of the present invention, the preferable embodiments of the method for producing the electrode plate of the present invention will be described referring to examples. However, it should be understood, these descriptions are provided merely for further describing the features and advantages of the present invention, but not for limiting the claims of the present invention. Besides, the graphene used in the present invention can be commercially purchased or can be provided by Ningbo Institute of Materials Technology & Engineering, Chinese Academy of Science.

Example 1 Method for Producing the Electrode Plate

Graphene Layers Modified $LiFePO_4$ Positive Electrode Plate (1) 70 parts by weight of graphene, 5 parts by weight of PVDF and 2000 parts by weight of NMP were sufficiently mixed and dissolved to obtain a slurry, the slurry was applied to both surfaces of an aluminum foil, and the coated foil was dried in an oven at 200° C. to obtain an aluminum foil modified with graphene layers. The thickness of the graphene layer on a single side was 3 microns (referred to as the inner graphene layer).

(2) 90 parts by weight of $LiFePO_4$, 5 parts by weight of PVDF, 5 parts by weight of SP and 200 parts by weight of NMP are sufficiently mixed and dissolved to obtain a slurry, the slurry was applied to both surfaces of the aluminum foil modified with graphene layers, and the coated foil was dried in an oven at 80° C. to obtain an electrode plate comprising positive material layers. The thickness of the positive material layer on a single side was 90 microns;

The above obtained electrode plate was used as the positive electrode, and a graphite electrode was used as the negative electrode. An 18650-type lithium iron phosphate power battery was produced according to method for producing a conventional commercial power battery, and electrochemical properties tests showed that the battery had a 0.2 C capacity of 1.1 Ah and a 2.95 V voltage at 10 C discharge plateau. The internal resistance of the battery tested by a battery test system was 12 mΩ.

The above obtained electrode plate was directly tested for conductivity of the electrode plate by four-probe method, and the surface resistance of the electrode plate was 33 mΩ·cm².

Example 2 Method for Producing the Electrode Plate

Graphene Layers Modified $LiFePO_4$ Positive Electrode Plate (1) 98 parts by weight of graphene, 3 parts by weight of PVDF and 2500 parts by weight of NMP were sufficiently mixed and dissolved to obtain a slurry, the slurry was applied to both surfaces of an aluminum foil, and the coated foil was dried in an oven at 80° C. to obtain an aluminum foil modified with graphene layers. The thickness of the graphene layer on a single side was 3 microns.

(2) 90 parts by weight of $LiFePO_4$, 5 parts by weight of PVDF, 5 parts by weight of SP and 200 parts by weight of NMP were sufficiently mixed and dissolved to obtain a slurry, the slurry was applied to both surfaces of the aluminum foil modified with graphene layers, and the coated foil was dried in an oven at 80° C. to obtain an electrode plate comprising positive material layers. The thickness of the positive material layer on a single side was 90 microns.

(3) 98 parts by weight of graphene, 3 parts by weight of PVDF and 2500 parts by weight of NMP were sufficiently mixed and dissolved to obtain a slurry, the slurry was applied to both surfaces of the aluminum foil, and the coated foil was dried in an oven at 80° C. to obtain an aluminum foil modified with graphene layers. The thickness of the graphene layer on a single side was 4 microns (referred to as the outer graphene layer).

The above obtained electrode plate was used as the positive electrode, and a graphite electrode was used as the negative electrode. An 18650-type lithium iron phosphate power battery was produced according to method for producing a conventional commercial power battery, and electrochemical properties tests showed that the battery had a 0.2 C capacity of 1.1 Ah and a 3.06 V voltage at 10 C discharge plateau. The internal resistance of the battery tested by a battery test system was 9 mΩ.

The above obtained electrode plate was directly tested for conductivity of the electrode plate by four-probe method, and the surface resistance of the electrode plate was 29 mΩ·cm².

Example 3 Method for Producing the Electrode Plate

Graphene Layers Modified Graphite Negative Electrode Plate (1) 89 parts by weight of graphene, 2 parts by weight of PVDF and 2100 parts by weight of NMP were sufficiently mixed and dissolved to obtain a slurry, the slurry was applied to both surfaces of an copper foil, and the coated foil was dried in an oven at 120° C. to obtain a copper foil modified with graphene layers. The thickness of the graphene layer on a single side was 2 microns.

(2) 92 parts by weight of graphite, 5 parts by weight of CMC, 3 parts by weight of KS-6 and 200 parts by weight of water were sufficiently mixed and dissolved to obtain a slurry, the slurry was applied to both surfaces of the copper foil modified with graphene layers, and the coated foil was dried in an oven at 110° C. to obtain an electrode plate comprising negative material layers. The thickness of the negative material layer on a single side was 90 microns;

The above obtained electrode plate was used as the negative electrode, and lithium iron phosphate was used as the positive electrode. An 18650-type lithium iron phosphate power battery was produced according to method for producing a conventional commercial power battery, and electrochemical properties tests showed that the battery had a 2.91 V voltage at 10 C discharge plateau. The internal resistance of the battery tested by a battery test system was 9 mΩ. The above obtained electrode plate was directly tested for conductivity of the electrode plate by four-probe method, and the surface resistance of the electrode plate was 28 mΩ·cm².

Example 4 Method for Producing the Electrode Plate

Graphene Layers Modified Graphite Negative Electrode Plate (1) 99 parts by weight of graphene, 25 parts by weight of PVDF and 5000 parts by weight of NMP were sufficiently mixed and dissolved to obtain a slurry, the slurry was applied to both surfaces of a copper foil, and the coated foil was dried in an oven at 50° C. to obtain a copper foil modified with graphene layers. The thickness of the graphene layer on a single side was 2 microns (referred to as the inner graphene layer);

(2) 80 parts by weight of graphite, 8 parts by weight of CMC, 7 parts by weight of KS-6 and 500 parts by weight of water were sufficiently mixed and dissolved to obtain a slurry, the slurry was applied to both surfaces of the copper foil modified with graphene layers obtained in step (1), and the coated foil was dried in an oven at 80° C. to obtain an electrode plate comprising negative material layers. The thickness of the negative material layer on a single side was 90 microns.

(3) 70 parts by weight of graphene, 20 parts by weight of PVDF and 3000 parts by weight of NMP were sufficiently mixed and dissolved to obtain a slurry, the slurry was applied to both surfaces of the electrode plate comprising negative material layers obtained in step (2), and the coated foil was dried in an oven at 150° C. to obtain an electrode plate modified with graphene layers. The thickness of the graphene layer on a single side was 3 microns (referred to as the outer graphene layer).

The above obtained electrode plate was used as the negative electrode, and lithium iron phosphate was used as the positive electrode. An 18650-type lithium iron phosphate power battery was produced according to method for producing a conventional commercial power battery, and electrochemical properties tests showed that the battery had a 3.12 V voltage at 10 C discharge plateau. The internal resistance of the battery tested by a battery test system was 7 mΩ.

The above obtained electrode plate was directly tested for conductivity of the electrode plate by four-probe method, and the surface resistance of the electrode plate was 26 mΩ·cm².

The following table showed the positive and the negative electrode plates and the power batteries produced using at least one of such electrode plates in Examples 5 to 13 of the present invention wherein the parameters were different from each other, as well as the comparison of the performances of the electrode plates and the power batteries produced therefrom in the present invention with those of conventional electrode plates and the power batteries produced therefrom. In Examples 5 to 13, the positive electrode plate comprising an outer graphene layer was produced in the same manner as Example 2, and the negative electrode plate comprising an outer graphene layer was produced in the same manner as Example 4; whereas the positive electrode plate comprising merely an inner graphene layer was produced in the same manner as Example 1, and the negative electrode plate comprising merely an inner graphene layer was produced in the same manner as Example 3.

Table 1 the graphene modified electrode plate of the present invention and comparison of the performance thereof with that of a conventional electrode plate

|  | inner grapheme layer (parameters on a single side) | electrode active material layer (parameters on a single side) | outer grapheme layer (parameters on a single side) | counter electrode | mean voltage 10 C discharge V | surface resistance of electrode plate mΩ·cm² | resistance of battery mΩ |
|---|---|---|---|---|---|---|---|
| conventional electrode plate | / | 90 microns thick; $LiFePO_4$:PVDF:SP:NMP = 90:5:5:200 | / | graphite | 2.92 | 35 | 13 |
| 5 | 4 microns thick; graphene:PVDF:NMP = 98:2:2000 | 90 microns thick; $LiFePO_4$:PVDF:SP:NMP = 90:5:5:200 | / | graphite | 3.05 | 30 | 10 |
| 6 | 3 microns thick; graphene:PVDF:NMP = 97:3:2000 | 90 microns thick; $LiFePO_4$:PVDF:SP:NMP = 90:5:5:200 | 4 microns thick; graphene:PVDF:NMP = 98:2:2000 | graphite | 3.08 | 28 | 8 |
| 7 | 2 microns thick; graphene:PVDF:NMP = 97:3:2000 | 90 microns thick; $LiMn_2O_4$:PVDF:SP:NMP = 90:5:5:200 | 4 microns thick; graphene:PVDF:NMP = 98:2:2000 | graphite | 3.85 | 25 | 6 |

| | inner grapheme layer (parameters on a single side) | electrode active material layer (parameters on a single side) | outer grapheme layer (parameters on a single side) | counter electrode | mean voltage 10 C discharge V | surface resistance of electrode plate mΩ · cm$^2$ | resistance of battery mΩ |
|---|---|---|---|---|---|---|---|
| 8 | 2 microns thick; graphene:PVDF:NMP = 97:3:2000 | 90 microns thick; artificial graphite:PVDF:SP:NMP = 90:5:5:200 | / | conventional electrode plate | 2.90 | 33 | 12 |
| 9 | 2 microns thick; graphene:PVDF:NMP = 97:3:2000 | 90 microns thick; artificial graphite:PVDF:SP:NMP = 90:5:5:200 | / | Example 6 | 3.11 | 27 | 7 |
| 10 | 3 microns thick; graphene:PVDF:NMP = 97:3:2000 | 90 microns thick; artificial graphite:PVDF:SP:NMP = 90:5:5:200 | 4 microns thick; graphene:PVDF:NMP = 98:2:2000 | Example 6 | 3.13 | 26 | 7 |
| 11 | 2 microns thick; graphene:PVDF:NMP = 97:3:2000 | 90 microns thick; artificial graphite:PVDF:SP:NMP = 90:5:5:200 | 4 microns thick; graphene:PVDF:NMP = 98:2:2000 | Example 7 | 3.88 | 23 | 5 |
| 12 | 3 microns thick; graphene:PVDF:NMP = 97:3:2000 | 90 microns thick; natural graphite:PVDF:SP:NMP = 90:5:5:200 | 4 microns thick; graphene:PVDF:NMP = 98:2:2000 | Example 7 | 3.90 | 22 | 4 |
| 13 | 2 microns thick; graphene:PVDF:NMP = 97:3:2000 | 90 microns thick; artificial graphite:PVDF:SP:NMP = 90:5:5:200 | 4 microns thick; graphene:PVDF:NMP = 98:2:2000 | Example 7 | 3.89 | 23 | 4 |

In the above table, the proportions of the components are by mass ratio.

Figure 3:
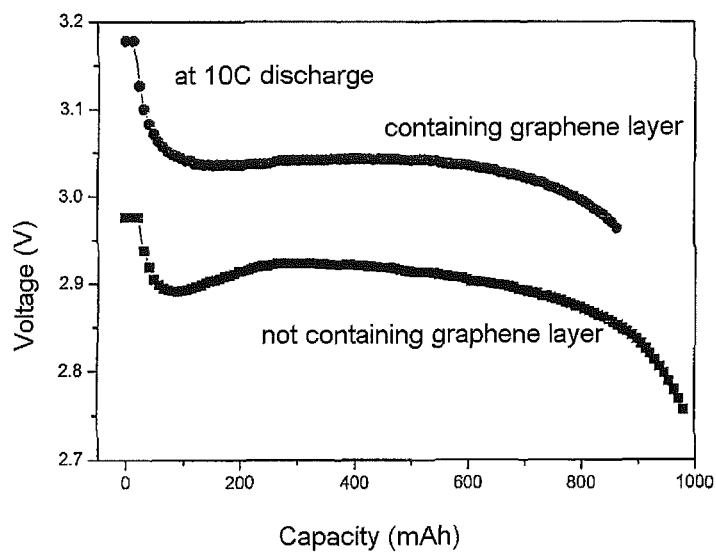
FIG. 3 is a diagram showing the comparison of the 10 C discharge performances of the lithium iron phosphate power batteries produced by the graphene coating-modified electrode plate for lithium secondary battery according to the present invention and the electrode plate in the prior art.

As can be seen from the above results, the graphene coating-modified electrode plates produced in the examples of the present invention have reduced resistance as compared with the prior electrode plates. As shown in FIG. 3, the power battery produced using the electrode plates containing graphene according to the present invention have increased mean voltage at high current discharge, reduced internal resistance and improved electrochemical performances as compared with the power battery produced using the prior electrode plates.

The present invention has been described above in detail. Specific embodiments are provided to illustrate the principle and the implementation of the present invention, and the descriptions in connection with these embodiments are provided to help understand the methods and the core spirits of the present invention. It should be noted, a person of ordinary skill in the art may carry out the present invention with some improvements and modifications without departing the principle of the present invention, and these improvements and modifications should be constructed as falling into the scope of protection of the present invention.

What is claimed is:

1. A graphene coating-modified electrode plate for lithium secondary battery, characterized in that, the electrode plate comprises a current collector foil, inner graphene layers coated on both surfaces of the current collector foil, and electrode active material layers coated on the graphene layers;
the electrode active material layer is further coated with an outer graphene layer;
wherein the graphene coating-modified electrode plate is graphene layers modified LiFePO$_4$ positive electrode plate, which is obtained from the following method:
(1) 98 parts by weight of graphene, 3 parts by weight of PVDF and 2500 parts by weight of NMP were sufficiently mixed and dissolved to obtain a slurry, the slurry was applied to both surfaces of an aluminum foil, and the coated foil was dried in an oven at 80° C. to obtain an aluminum foil modified with graphene layers, the thickness of the graphene layer on a single side was 3 microns (referred to as the inner graphene layer);
(2) 90 parts by weight of LiFePO4, 5 parts by weight of PVDF, 5 parts by weight of SP and 200 parts by weight of NMP were sufficiently mixed and dissolved to obtain a slurry, the slurry was applied to both surfaces of the aluminum foil modified with graphene layers, and the coated foil was dried in an oven at 80° C. to obtain an electrode plate comprising positive material layers, the thickness of the positive material layer on a single side was 90 microns;
(3) 98 parts by weight of graphene, 3 parts by weight of PVDF and 2500 parts by weight of NMP were sufficiently mixed and dissolved to obtain a slurry, the slurry was applied to both surfaces of the aluminum foil, and the coated foil was dried in an oven at 80° C. to obtain an aluminum foil modified with graphene layers, the thickness of the graphene layer on a single side was 4 microns (referred to as the outer graphene layer).

2. A graphene coating-modified electrode plate for lithium secondary battery, characterized in that, the electrode plate comprises a current collector foil, inner graphene layers coated on both surfaces of the current collector foil, and electrode active material layers coated on the graphene layers;
the electrode active material layer is further coated with an outer graphene layer;
wherein the graphene coating-modified electrode plate is graphene layers modified LiMn$_2$O$_4$ positive electrode plate, which is obtained from the following method:
(1) 97 parts by weight of graphene, 3 parts by weight of PVDF and 2000 parts by weight of NMP were sufficiently mixed and dissolved to obtain a slurry, the slurry was applied to both surfaces of an aluminum foil, and the coated foil was dried in an oven at 80° C. to obtain an aluminum foil modified with graphene layers, the thickness of the graphene layer on a single side was 2 microns (referred to as the inner graphene layer);

(2) 90 parts by weight of $LiMn_2O_4$, 5 parts by weight of PVDF, 5 parts by weight of SP and 200 parts by weight of NMP were sufficiently mixed and dissolved to obtain a slurry, the slurry was applied to both surfaces of the aluminum foil modified with graphene layers, and the coated foil was dried in an oven at 80° C. to obtain an electrode plate comprising positive material layers, the thickness of the positive material layer on a single side was 90 microns;

(3) 98 parts by weight of graphene, 2 parts by weight of PVDF and 2000 parts by weight of NMP were sufficiently mixed and dissolved to obtain a slurry, the slurry was applied to both surfaces of the aluminum foil, and the coated foil was dried in an oven at 80° C. to obtain an aluminum foil modified with graphene layers, the thickness of the graphene layer on a single side was 4 microns (referred to as the outer graphene layer).

3. A graphene coating-modified electrode plate for lithium secondary battery, characterized in that, the electrode plate comprises a current collector foil, inner graphene layers coated on both surfaces of the current collector foil, and electrode active material layers coated on the graphene layers;

the electrode active material layer is further coated with an outer graphene layer;

wherein the graphene coating-modified electrode plate is graphene layers modified graphite negative electrode plate, which is obtained from the following method:

(1) 99 parts by weight of graphene, 25 parts by weight of PVDF and 5000 parts by weight of NMP were sufficiently mixed and dissolved to obtain a slurry, the slurry was applied to both surfaces of an aluminum foil, and the coated foil was dried in an oven at 50° C. to obtain an aluminum foil modified with graphene layers, the thickness of the graphene layer on a single side was 2 microns (referred to as the inner graphene layer);

(2) 80 parts by weight of graphite, 8 parts by weight of CMC, 7 parts by weight of KS-6 and 500 parts by weight of water were sufficiently mixed and dissolved to obtain a slurry, the slurry was applied to both surfaces of the copper foil modified with graphene layers obtained in step (1), and the coated foil was dried in an oven at 80° C. to obtain an electrode plate comprising negative material layers, the thickness of the negative material layer on a single side was 90 microns;

(3) 70 parts by weight of graphene, 20 parts by weight of PVDF and 3000 parts by weight of NMP were sufficiently mixed and dissolved to obtain a slurry, the slurry was applied to both surfaces of the electrode plate comprising negative material layers obtained in step (2), and the coated foil was dried in an oven at 150° C. to obtain an electrode plate modified with graphene layers, the thickness of the graphene layer on a single side was 3 microns (referred to as the outer graphene layer).

4. A graphene coating-modified electrode plate for lithium secondary battery, characterized in that, the electrode plate comprises a current collector foil, inner graphene layers coated on both surfaces of the current collector foil, and electrode active material layers coated on the graphene layers;

the electrode active material layer is further coated with an outer graphene layer;

wherein the graphene coating-modified electrode plate is graphene layers modified graphite negative electrode plate, which is obtained from the following method:

(1) 97 parts by weight of graphene, 3 parts by weight of PVDF and 2000 parts by weight of NMP were sufficiently mixed and dissolved to obtain a slurry, the slurry was applied to both surfaces of an aluminum foil, and the coated foil was dried in an oven at 50° C. to obtain an aluminum foil modified with graphene layers, the thickness of the graphene layer on a single side was 2 microns (referred to as the inner graphene layer);

(2) 90 parts by weight of graphite, 5 parts by weight of PVDF, 5 parts by weight of SP and 200 parts by weight of NMP were sufficiently mixed and dissolved to obtain a slurry, the slurry was applied to both surfaces of the copper foil modified with graphene layers obtained in step (1), and the coated foil was dried in an oven at 80° C. to obtain an electrode plate comprising negative material layers, the thickness of the negative material layer on a single side was 90 microns;

(3) 98 parts by weight of graphene, 2 parts by weight of PVDF and 2000 parts by weight of NMP were sufficiently mixed and dissolved to obtain a slurry, the slurry was applied to both surfaces of the electrode plate comprising negative material layers obtained in step (2), and the coated foil was dried in an oven at 150° C. to obtain an electrode plate modified with graphene layers, the thickness of the graphene layer on a single side was 4 microns (referred to as the outer graphene layer).

* * * * *